United States Patent Office 3,187,689
Patented June 8, 1965

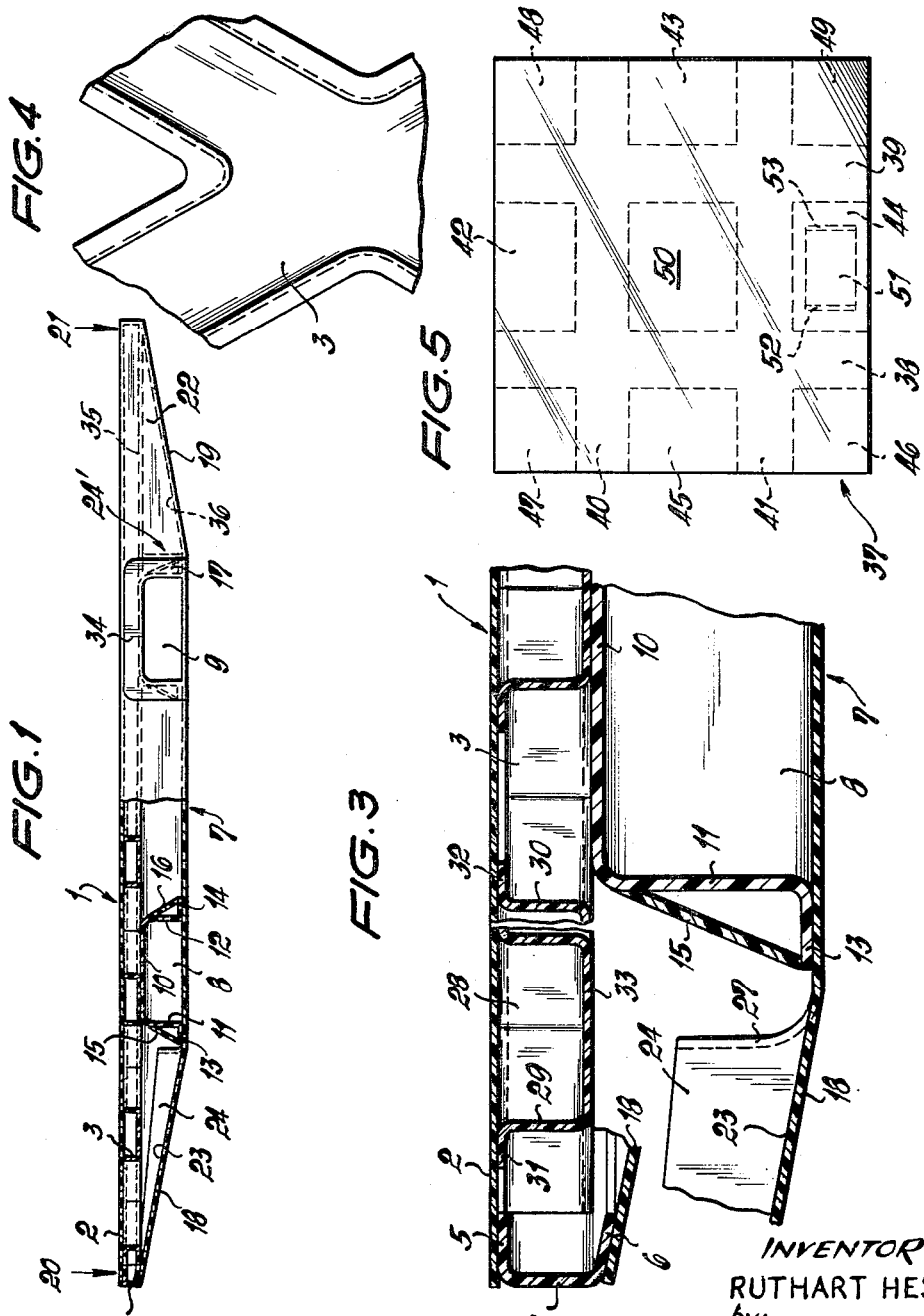

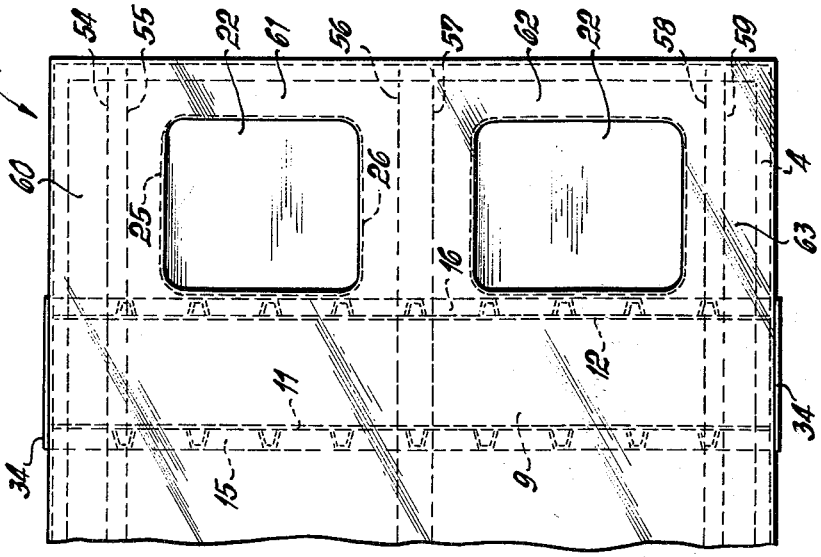
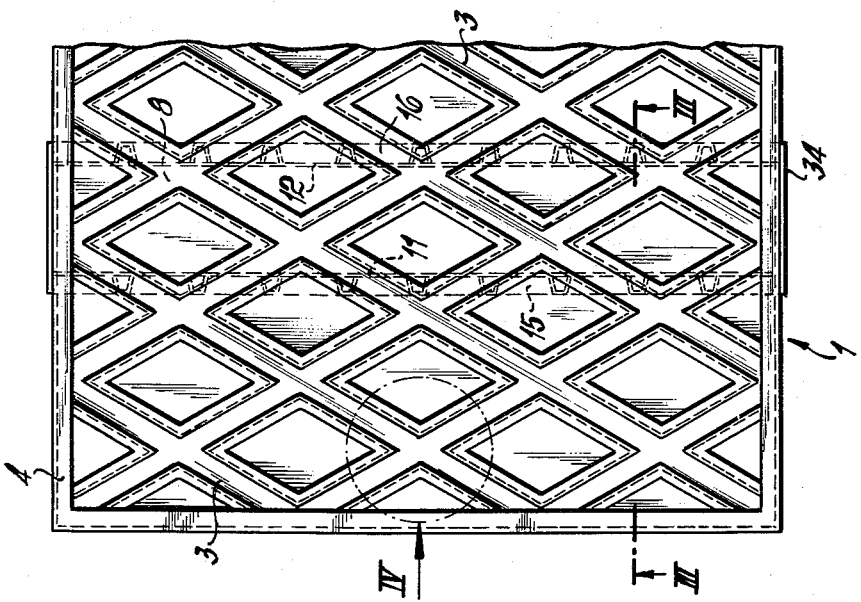

3,187,689
PALLET
Ruthart Hess, Hamburg-Wandsbek, Germany, assignor to Kunststoffwerk Erbach G.m.b.H., Erbach, Odenwald, Germany
Filed Oct. 19, 1962, Ser. No. 234,574
Claims priority, application Germany, Oct. 20, 1961, P 19,335, Reg. No. (utility model) 1,856,981
13 Claims. (Cl. 108—58)

The invention relates to a pallet with a platform which is preferably reinforced and with at least two parallel hollow profiled channel members for the insertion of fork lift devices.

The invention also includes the type of multi-reinforced pallet in which two crossed pairs of parallel hollow profiled channel members are provided for the insertion of lift fork devices. In the preferred form of the invention, the pallet is made of plastic material. Pallets of plastic materials are well known. However, the invention also includes those types made of other materials such as wood and metal, and even those made only partly of other such materials.

This type of pallet is characterised by the problem of producing on the one hand a pallet which is very light and made from as little material as possible, and on the other hand of attaining a sufficient strength to permit heavy loads to be received. An embodiment made from synthetic resin or other plastic material has the advantage of weather-resistance and chemical-resistance as well as having a capacity for repair, but the problem still remains of providing the desired strength properties in the pallet with as little material as possible.

The invention solves the basic problem by having the hollow profiled channel members placed under the platform and by having at least one base-like wall portion provided which extends to the edges of the pallet which are parallel with the profiled channel members. In practice, the base-like wall portion forms part of a latticed structural element which disperses the weight of the load to the edges of the pallet, so that the highest strength properties are produced with the smallest possible amount of material and space. According to the preferred form of the invention, the base-like wall portion has a middle section which extends between and under the hollow profiled channel members and up to the outer wall portions, and end sections which rise transversely from the outer sides of the hollow channel members up to the outer edges of the platform. In a similar manner struts are fixed to the edges of the pallet and extend toward the center to distribute more evenly portions of the load.

In particular, to further reinforce the pallet, additional base-like strips which run parallel to each other, are provided in a special embodiment, at the underside of the platform. It is preferred nevertheless and is in reality wholly advantageous to provide a base-like wall portion which extends over the whole under-surface of the pallet, which section is curved in some locations. In a so-called one-way pallet, the base-like wall portion is formed in a line round two existing outer edges of the hollow channel members and extends transversely up between the aforedescribed outer edges and the neighbouring parallel edges of the pallet.

It is advantageous to arrange profiled fairings in the base-like wall portions substantially perpendicular to the longitudinal axis of the hollow profiled channel members, especially in the form of corrugations. Thereby, an excellent strengthening is obtained in the required direction of reinforcement.

According to the preferred embodiment of the invention, the fairings have apertures which have wall portions extending in the direction towards the platform. These wall portions are preferably arranged at every edge of the apertures, but at least (and also with a two-way pallet) at the edges running perpendicular to the direction of the hollow channel members. These apertures according to a special preferred form of the invention, are placed only in the transverse ended portions of the base-like wall portion lying in the area adjacent to the edges of the pallet. This is suitably accounted for by spacing the angled wall portions, which extend perpendicularly towards the neighbouring edge in the middle of the pallet, at a greater height from the surface of the pallet.

An advantageous embodiment of the invention consists in the arrangement of this angled wall portion at such a height that it rests on the underside of the platform so that it forms a support. To improve this upright wall portion, the upper edge is angled outwards to form a supporting surface in contact with the platform and, according to an advantageous design, it is connected to the underside of the platform. It may be pointed out that such a type of support for the platform can also be used in the middle part of the base-like wall portion. The invention includes a pallet with two crossed pairs of hollow channel members arranged under the platform, which is substantially rectangular so that the portions of the base-like wall portions extend from a rectangular edge formed by the intersection of the outsides of the hollow channel members upwardly to the edge of the platform. In the design of the pallet with two crossed pairs of hollow channel members, a lower plate is provided between two adjacent hollow side members, which extends along their entire length and base-like wall portions are provided along all the corners of the pallet so as to extend from these corners of the pallet downward towards the flat bottom portion.

According to the aforedescribed embodiment, the fairings are provided at the underside of the platform in a special cross pattern.

According to a preferred form of the invention, the hollow channel members are in the form of U-sections and their free ends have outwardly directed legs arranged at equal fixed distances, which form substantially brace-type stiffening bars between the upper transverse flange of the channel member and the outwardly extending leg portions thereof respectively.

It is preferable to have the brace-type stiffening bar in the form of a convex body with a cross-section approximately the same thickness than the outwardly directed legs of the U-section of the hollow channel member. It may be pointed out that the base-like wall portion is fixed to these outwardly directed legs in a special way by welding or binding means.

A preferred form of the pallet consists of an embodiment in which the platform is formed by continuous preferably profiled plate under which lattice-like strut elements are arranged, the latter also preferably having the shape of U-sections. According to the preferred form of this embodiment, these lattice-like strut elements are of hollow form, are of an open U-section with outwardly facing flanges which are fixed to the plate at its underside, while the cross flange of the U-section is supported in the region of the profiled channel members by the latter.

The invention also includes an embodiment in which the platform has a lower continuous plate passing between the lattice-like strut elements and the hollow profiled channel members.

Likewise, the lattice-like strut elements are preferably made in one piece and define rhombic intermediate spaces.

The invention also provides that the lattice-like strut elements have a U-shaped section, formed as rectilinear elements with a zig-zag pattern, the back portion of each adjoining strut element being connected to the hollow channel member.

A special characteristic of the invention is that the plate has a preferably U-shaped inwardly facing peripheral member, the lower side flange of which on at least two sides of the pallet corresponds to the slope of the adjacent oblique base-like portion.

Further improvements and features of the invention are given in the description of the preferred embodiments which are shown in the accompanying drawings, wherein:

FIG. 1 shows the side elevation of a pallet in which the left-hand half is shown in section;

FIG. 2a, 2b shows a plan view of the pallet, the left half (FIG. 2a) being in plan view, so that the upper wall portion is removed, and the right half (FIG. 2b) being as seen from underneath;

FIG. 3 shows a partial enlarged section along the line III—III in FIG. 2a, where, to reduce the scale, certain portions are not shown clearly.

FIG. 4 shows a cutaway section according to the circle IV in FIG. 2a to show clearly a cross member of the lattice-like strut elements;

FIG. 5 shows a plan view in schematic form of a two-way pallet.

The pallet is characterised by a platform 1 which consists of a continuous upper wall portion 2 and, under it, there are formed lattice-like strut elements 3. This platform has mounted at its edges channel members 4 which have a substantially U-shaped cross-section and are arranged so that the open side of the U faces towards the center of the pallet. The upper flanges 5 of these channel members 4 lie most advantageously under the wall portion 2 and are connected to it. Other flanges 6 obliquely extend from the web of channel members 4 to the extensions 18, 19 of a base member wall portion 7 which is thereby connected to channel members 4. The connections can be made in a well-known manner depending upon the material used, for example using binding agents or by welding.

Below the platform consisting of the parts 2 and 3, are placed at least two parallel hollow channel members, 8, 9. In FIGS. 1 and 2, the embodiment shown is a so-called one-way pallet, so that only one pair of these hollow profiled channel members are used. It is to be undrestood that the invention can be provided with more than two such channel members so that a multiway pallet is formed, whereby the arms of fork lift devices can be inserted from all sides. The preferred form is, however, a one-way pallet.

The hollow channel members are usually of U-shaped cross-section. The upper flange 10 preferably lies immediately under the lattice-like strut elements 3 and may be connected to them, although the insertion of a plate-shaped screen section between them may be included. The upright side-legs 11, 12 have outwardly-facing flange portions 13, 14 extending from their lower free ends. A special feature includes between the outer ends of the flange portions 13, 14 up to the height of the upper flanges 10 the placing of reinforcing braces 15, 16 respectively which are formed from synthetic resin. These reinforcing braces are designed as hollow bodies and can be distinguished by numerals 15, 16 in FIG. 2a, 2b and these hollow bodies are preferably open at the side abutting against the side legs 11, 12. It is possible, however, for the reinforcing braces 15, 16 to be continuous and thereby to provide supporting struts outwardly and to be secured to the upright side parts 11, 12 as well as to the flange portions 13, 14 for example with binding agents or by welding. In effect, this essentially triangular strengthening strut arrangement contributes materially to the strength of the structure as a whole.

The outwardly-facing flange portions 13, 14 create a surface layer for the base-member wall portion 7 which extends in the example given in the specification over the whole breadth of the pallet. The wall portion 7 extends over the middle section out to the outer edges of the hollow channel members 8, 9, which are respectively formed by the flange portion 13 and the flange portion 17, which are horizontal and parallel to the upper plate 2. This wall portion 7 is fixed to flange portions 13, 14 and 17 respectively. From the outer flange portions 13, 17 to the edges wall portion 7 extends by means of its sloping sections 18, 19 to the outer channel members 4. The outer ends abut against the flange 6 and are firmly secured to it. It is also possible, for example, for the outer channel members 4 to be formed on at least two sides of the pallet integrally with the portions 7, 18, 19 so that parts of these portions are made to slope from channel member 4 to the wall portion 7. However, the type given in the specification is favoured because it can be manufactured more easily.

If the outer edges of the pallet according to FIG. 1 are heavily loaded in the direction of the arrows 20, 21, the sloping sections 18, 19 of the wall portion 7 must be provided with suitable reinforcing members. For this purpose, these portions for example are preferably provided with reinforcing fins, serrated ribs, corrugations or the like, with their axes parallel to the plane of the diagram in FIG. 1.

However, the drawing shows at the same time a special advantageous kind of design, with reinforcing fins 22, 23 extending upwardly from the sections 18, 19 of the portion 7 whose upper edges as shown by member 24 are sloping upwards. These members 24 preferably extend at least to the edge sections 25, 26 suitable (see FIG. 2b) and can be made integral therewith and are suitable to form a rim around openings 22, 23. Moreover, the member 24 which forms the edges 25, 26 is located as is shown in FIG. 2b and preferably extends towards the edges at the middle of the pallet at such a location that the empty space defined by the edges 25, 26 between the platform 1 and the portion 7 is as large as possible.

In FIG. 2b the dotted lines 54, 55, 56, 57, 58, 59 show that the base-member wall portion 7 can include a plurality of reinforcing strips which are particularly required when the pallet includes the openings 22 formed between the segments 60, 61, 62, 63.

FIG. 3 shows for example an upwardly directed wall portion 27, at the edge of the aperture 23 which is parallel to the hollow channel members 11, 10, 12.

It is to be understood that several apertures 22, 23 can be placed next to one another along a hollow channel member 11, 10, 12 and in particular that such apertures can be placed in the middle section of the base-member wall portion 7 between the hollow channel members 11, 10, 12.

The lattice-like strut elements 3 which are illustrated in FIGS. 1 and 2 are suitably formed in a single piece over the entire under-surface of the pallet and are generally formed from synthetic resin. The separate portions of elements 3 therefore are formed as crossed, hollow channel members 28, which are suitably of an open U-section shape, whose vertical webs 29, 30 possess outer sloping flanges 31, 32, on which the plate 2 is secured by cementing or welding. The portion of the base-web 33 of the channel members 28 which abuts against the upper flanges 10 of the hollow channel members may be connected thereto, also for instance by welding. It should be pointed out, however, that at this point, a connection is preferably not provided, so that the pallet has a certain elasticity when it deforms under loading conditions. According to another embodiment of the invention the base-web 33 can, nevertheless, be welded or cemented to the upper flanges 10. As is indicated in FIG. 2a, the crossed pieces of the lattice-like strut elements 3 are formed in one piece. A magnified crossing point is shown in FIG. 4. The spaces defined between the crossed pieces of elements 3 have a rhombic shape with the longer axes of the rhombi preferably running parallel to the longitudinal axes of the hollow channel members 8, 9. This arrangement is only of importance in the generally preferred case of a one-way pallet.

FIG. 1 shows on the right how the sloping edge piece 24' is brought up to the underneath part of the platform 1. The upper rim of the edge piece 24' slopes as shown at 35, so that the platform 1 is partially supported and therefore reinforced with this sloping edge piece 24'. It is to be understood that the plate 24' is integral with a lower wall element 7 and runs along the line 36, or in the alternative may be connected with the bottom of the lattice-like strut elements 3, to which for example it can be secured by welding. It is to be understood that embodiments of my invention can be made with a modified rib and platform construction. In the one-way type of pallet, the edges which run parallel to the plane of the drawing, in FIG. 1, are covered by end plates formed by the contours given by the baselike parts 18, 7, 19 of specified contours, which end plates for reinforcement as upright webs. The hollow channel members, 8, 9 extend preferably through openings or cross-pieces and end at their outer sides in the form of outwardly bent flanges 34. The end plates are preferably arranged and connected to the vertical web portion of the outer channel members 4 and are connected at their lower edges with the base-like wall portions 18, 7, 19. For this purpose, the end plates, one of which is shown in FIG. 1 at 35, are provided at their lower edges by angle pieces bent inwardly towards the pallet which engage over the base-like wall portion and rest upon it according to a preferred form of the invention, but which are preferably connected to it.

The invention provides, with the profiled members as specified, a very stable constructional form, in which the hollow channel members 8, 9 according to FIG. 3, are made preferably with almost as strong a section modulus as the adjacent outer parts giving considerable strength in the vertical direction. Additional strength in the vertical direction is provided through the sloping wall portion 24, the end plate 35 and the kind of lattice-like strut elements 3 in the other planar direction. FIG. 5 shows the pallet 37 from above. Two pairs of hollow channel-like profiled members 38, 39 and 40, 41, respectively, cross underneath the pallet. Between the ends of the hollow channel-like profiled members 38, 39, 40, 41, base-like wall portions 42, 43, 44, 45 extend obliquely from the under edge of the members 38, 39, 40, 41 to the neighbouring outer edge of the pallet. The base-like wall portions 46, 47, 48, 49 extend from the inner joint at the level of the lower edges of the hollow profiled members up to the outer edges of the plate of the pallet.

It is to be understood that in the middle region at 50 a corresponding lower horizontal base-like plate is provided. Further, openings can be made in various ways in the base-like wall portions 42, 43, 44, 45. One such an opening is shown in the wall piece 44 at 51 and it is evident that this opening has upwardly extending rim portions 52, 53 in the form previously described. Corresponding openings can be suitably disposed in the wall portions 45, 42, 43 as well as in the middle wall member 50.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A pallet, comprising in combination, a platform, a plurality of intersecting reinforcing channel members arranged under said platform in a plane parallel to said platform and being secured to the undersurface of said platform, at least two substantially parallel channel members are arranged immediately underneath said plurality of reinforcing channels in a plane substantially parallel thereto, said channel members and said plurality of reinforcing channels being substantially co-extensive with said platform, a base member extending transversely and parallel to said platform underneath said two channel members, said base member extending obliquely upwardly toward said platform between the edges of the latter and said channel members and being operatively connected to said platform at substantially the edges thereof, each one of said two channel members having at least one outwardly facing opening for the insertion of lifting means.

2. A pallet made of plastic material, comprising in combination, a platform, a plurality of intersecting reinforcing channel members arranged underneath said platform in a plane parallel to said platform, at least two substantially parallel channel members arranged immediately underneath said plurality of reinforcing channels in a plane parallel thereto, said channel members and reinforcing means being substantially co-extensive with said platform, two face to face edge channels secured to the undersurface of said platform and respectively extending along the two opposite edges of said platform which are parallel to the longitudinal axes of said two channel members, a base extending between and underneath said two channel members and being operatively connected thereto, at least two upwardly rising extensions of said base integrally connecting each side thereof to the lower leg of the corresponding edge which oppositely faces said side, each of said two channel members having at least one opening on the same side of said pallet for the insertion of lifting means.

3. The pallet as defined in claim 1 including a sheet of plastic material extending in a plane parallel to said platform between said plurality of intersecting reinforcing channels and said two channel members and being secured to the upper back of the latter.

4. The pallet as defined in claim 2, including a plurality of reinforcing fins extending between said two upwardly rising extensions and the undersurfaces of a corresponding plurality of said intersecting reinforcing channel members which oppositely face said two upwardly rising extensions, said reinforcing fins being secured to corresponding oppositely facing reinforcing channels.

5. The pallet as defined in claim 2, including at least one opening in each of said two upwardly rising extensions.

6. The pallet as defined in claim 5 wherein each of said openings has a peripheral wall portion extending upwardly to the undersurfaces of oppositely facing intersecting reinforcing channel members of said plurality thereof.

7. A pallet, comprising in combination, a platform (1), at least two channel members (8, 9) arranged underneath said platform, said two channel members having horizontal webs (10) and vertical flange portions (11, 12, 13, 14, 17) said webs being secured to the underside of said platform, at least one base member (7) extending underneath and transversely across at least part of the length of said two channel members and being secured to said vertical flange portions, said base member being substantially parallel to said platform in the area between said two channel members and having a pair of upwardly bent portions (18, 19) which extend to opposite edges of said pallet that are parallel to said two channel members in the area between the outer vertical flange portions (11, 17) of said channel members and said opposite edges (4) of said pallet, and are respectively secured to said opposite edges.

8. A pallet, comprising in combination, a platform, at least two channel members arranged underneath said platform, each one of said two channel members having substantially horizontal web and a pair of vertical flanges, said horizontal web abutting against the underside of said platform, at least one base member extending underneath and transversely across at least part of the length of said two channel members and being secured to said vertical flange portions, said base member being substantially parallel to said platform in the area between said two channel members and having a pair of upwardly bent portions which extend to opposite edges of said pallet that are parallel to said two channel members in the area between the outer vertical flange portions of said channel members and said opposite edges of said pallet and are respectively secured to corresponding opposite edges.

9. The pallet as defined in claim 8, wherein at least some of the parts are made of plastic material.

10. The pallet as set forth in claim 7, including at least one opening (22) in each of said upwardly bent portions (18, 19).

11. The pallet as set forth in claim 7, including bracing members (15, 16) secured to opposite ends of each said vertical flange portions (11, 12, 13, 14).

12. The pallet as set forth in claim 7, wherein said edges of said pallet that are parallel to said two channel members (8, 9) comprise a pair of mutually facing U-shaped channel members (4), each of which has an upper flange (5) which is secured to the outer periphery of said platform (1, 2) and a lower flange (6) which projects at an obtuse angle from said U-shaped channel member (4) corresponding to the angle of inclination of a corresponding upwardly bent portion (18, 19) and being connected thereto.

13. The pallet as set forth in claim 7, wherein said two channel members (8, 9) include end flange portions (34) which are perpendicular to the longitudinal axis of said channel members and are integral with the peripheries of each of the ends thereof.

References Cited by the Examiner
UNITED STATES PATENTS

| | | | |
|---|---|---|---|
| 2,444,183 | 6/48 | Cahners | 108—56 |
| 2,463,214 | 3/49 | Stoner | 108—52 |
| 2,568,582 | 9/51 | Farrar | 108—57 |
| 2,576,715 | 11/51 | Farrell | 108—56 |
| 2,634,931 | 4/53 | Weitzel | 108—51 |
| 2,692,107 | 10/54 | Ridder et al. | 108—51 |
| 2,728,545 | 12/55 | Hermitage | 108—56 |
| 2,957,668 | 10/60 | Norquist et al. | 108—56 |
| 2,991,965 | 7/61 | Drieborg | 108—56 |
| 3,113,532 | 12/63 | White | 108—56 |

FRANK B. SHERRY, *Primary Examiner.*